United States Patent [19]
Nate et al.
[11] Patent Number: 4,992,095
[45] Date of Patent: Feb. 12, 1991

[54] ALLOY TARGET USED FOR MANUFACTURING MAGNETO-OPTICAL RECORDING MEDIUM

[75] Inventors: Tasuo Nate; Toshio Morimoto, both of Ichikawa; Shinobu Endo, Komae, all of Japan

[73] Assignee: Sumitomo Metal Mining Company, Ltd., Tokyo, Japan

[21] Appl. No.: 426,710

[22] Filed: Oct. 26, 1989

[30] Foreign Application Priority Data

Oct. 26, 1988 [JP] Japan ................ 63-268216
Oct. 26, 1988 [JP] Japan ................ 63-268217

[51] Int. Cl.[5] ................ B22F 9/00
[52] U.S. Cl. ................ 75/246; 420/83; 420/435; 420/455
[58] Field of Search ................ 75/246; 420/455, 83, 420/435; 419/23, 33, 48

[56] References Cited

U.S. PATENT DOCUMENTS

| | | | |
|---|---|---|---|
| 4,582,535 | 4/1986 | Buschow | 75/246 |
| 4,620,872 | 11/1986 | Hijikata et al. | 75/246 |
| 4,915,737 | 4/1990 | Morimoto et al. | 75/246 |
| 4,915,738 | 4/1990 | Morimoto et al. | 75/246 |

*Primary Examiner*—Brooks H. Hunt
*Assistant Examiner*—Ngoclan T. Mai
*Attorney, Agent, or Firm*—Watson, Cole, Grindle & Watson

[57] ABSTRACT

An alloy target used for manufacturing a magneto-optical recording medium, wherein the component and composition comprises 10–50 atom % of at least one of rare earth elements selected from the group consisting of Nd, Sm, Gd, Tb, Dy, Ho, Er and Tm, from 0.1 to 10 atom % of at least one of additive elements selected from the group consisting of B, Al, Si, P, Ti, V, Cr, Mn, Zr, Nb, Mo, Hf, Ta, W, Pt, Pb and Bi and the balance substantially composed of at least one of transition metals selected from the group consisting of Co, Fe and Ni; and a structure comprises any one of mixed structure from a group consisting of (1) a mixed structure comprising a phase of intermetallic compound of rare earth element—additive element—transition metal, and a fine mixed phase of rare earth element and intermetallic compound of rare earth element—transition metal, (2) a mixed structure comprising a phase of intermetallic compound of rare earth element—transition metal and a fine mixed phase of rare earth element and intermetallic compound of rare earth element—transition metal (at least one of the rare earth element and the intermetallic compound in the fine mixed phase contains additive element); (3) a mixed phase comprising a phase of intermetallic compound of rare earth element—transition metal and a phase of intermetallic compound of rare earth element—additive element; (4) a mixed structure comprising any one of the mixed structures (1), (2) and (3) above and a phase of rare earth element alone; and (5) a mixed structure of any one of the mixed structures comprising a phase of intermetallic compound of rare earth element—additive element—transition metal, and a phase of rare earth element alone; in which the phase of the transition metal alone is not substantially present.

8 Claims, No Drawings

ALLOY TARGET USED FOR MANUFACTURING MAGNETO-OPTICAL RECORDING MEDIUM

BACKGROUND OF THE INVENTION

1. Field of the Invention

This invention relates to an alloy target which is suitable for use in the manufacture of a magneto-optical recording medium by sputtering.

2. Description of the Prior Art

A magneto-optical memory has been drawing attention in recent years as it can facilitate the erasure and recording of information single-crystal materials such as garnets, polycrystalline materials such as MnBi and PtCo, and amorphous materials such as alloys of rare earth elements and transition metals are known as useful materials in making magneto-optical memories.

Of these materials, an amorphous alloy comprising a rare earth element and transition metal, for example, Tb-Fe-Co or Gd-Tb-Fe, provides a variety of advantages, for example, requiring only a small amount of energy for recording, being free from any grain-boundary noise, and providing the capability of producing large-sized material relatively easily.

As a method of manufacturing a thin film of such amorphous alloy, a sputtering method wherein ions collide against a target to form a thin film on a substrate positioned near the target is often used.

Target materials used in the sputtering technique should exhibit limited cracking, and a satisfactory uniform composition. One known material has a mixed structure comprising a phase of intermetallic compound of rare earth element and transition metal and a phase of transition metal alone (Japanese Laid-Open patent application No. Sho 62-70550).

However, the target material involves such drawbacks such that (1) the composition of the film obtained is greatly different from that of the target, (2) the permeability is so high that only a small magnetic flux leaks from the surface of the target, resulting in a low sputtering efficiency and thereby a reduced efficiency in using the target, especially when a magnetron sputtering device is employed; and (3) the surface of the target shows remarkable change in the shape regarding (2) above, which causes a change in the composition of the film with lapse of sputtering time.

SUMMARY OF THE INVENTION

The object of the present invention is to overcome the foregoing problems and to provide a target suitable to be used in the sputtering method and which (1) causes less cracking, (2) is capable of providing a uniform film composition, (3) shows less difference in the composition between the target and the film, (4) gives high efficiency in utilizing the target, and (5) causes less change in the composition of the resultant film with elapse of time.

The present inventors have continued an earnest study for overcoming the foregoing problems and attaining the above-mentioned object and, as a result, have accomplished the present invention, based on the finding that the foregoing object can be attained by a target with a structure in which a phase of transition metal alone is not substantially present but a specific addition element is localized. That is, the present invention concerns an alloy target used for manufacturing a magneto-optical recording medium, wherein the component and composition comprises from 10 to 50 atom % of at least one of rare earth element selected from the group consisting of Nd, Sm, Gd, Tb, Dy, Ho, Er and Tm, from 0.1 to 10 atom % of at least one of additive elements selected from the group consisting of B, Al, Si, P, Ti, V, Cr, Mn, Zr, Nb, Mo, Hf, Ta, W, Pt, Pb and Bi and the balance substantially composed of at least one of transition metals selected from the group consisting of Co, Fe and Ni, and the structure comprises any one of mixed structure from (1) a mixed structure comprising a phase of intermetallic compound of rare earth element—additive metal—transition metal and a fine mixed phase of rare earth element and intermetallic compound of rare earth element—transition metal, (2) a mixed structure comprising a phase of intermetallic compound of rare earth element—transition metal, and a fine mixed phase of rare earth element and intermetallic compound of rare earth element—transition metal (at least one of the rare earth element and the intermetallic compound in the fine mixed phase contains the additive element), (3) a mixed structure comprising a phase of intermetallic compound of rare earth element—transition metal and a phase of intermetallic compound of rare earth element—additive element, (4) a mixed structure comprising any one of the mixed structures of (1), (2) and (3) and a phase of rare earth element alone, and (5) a mixed structure of any one of the mixed structures comprising a phase of intermetallic compound of rare earth element—additive element—transition metal and a phase of rare earth element alone: in which the phase of transition metal alone is not substantially present.

DETAILED DESCRIPTION OF THE INVENTION

In the present invention, at least one of neodymium (Nd), samarium (Sm), gadolinium (Gd), terbium (Tb), dysprosium (Dy), holmium (Ho), erbium (Er) and Thulium (Tm) is used as the rare earth element. Further at least one of boron (B), aluminum (Al), silicon (Si), phosphorus (P), titanium (Ti), vanadium (V), chromium (Cr), manganese (Mn), zirconium (Zr), niobium (Nb), molybdenum (Mo), hafnium (Hf), tantalum (Ta), tungsten (W) platinum (Pt), lead (Pb) and bismuth (Bi) is used as the additive element. Further, at least one of cobalt (Co), iron (Fe) and nickel (Ni) is used as the transition metal.

It is necessary that the component and composition of the alloy target according to the present invention comprises from 10 to 50 atom % of at least one of rare earth elements described above, from 0.1 to 10 atom % of at least one of additive elements and the balance substantially consisting of at least one of transition metal elements. If the amount of the rare earth element is less than 10 atom % or more than 50 atom %, the magneto-optical properties of the thin film obtained by the sputtering are not satisfactory. Further, the corrosion resistance of the resultant thin film is not satisfactory if the amount of the additive element is below 0.1 atom % and on the other hand, the magneto-optical property of the thin film is not satisfactory if it exceeds 10 atom %.

The alloy target of the present invention may include those impurities, for example, calcium (Ca), carbon (C) or sulfur (S) which may be intruded inevitablY in view of the production.

The structure of the alloy target according to the present invention has (1) a mixed structure comprising a phase of intermetallic compound of rare earth element—additive metal—transition metal and a fine mixed phase of rare earth element and intermetallic compound of rare earth element—transition metal, (2) a mixed structure comprising a phase of intermetallic compound of rare earth element—transition metal, and a fine mixed phase of rare earth element and an intermetallic compound of rare earth element—transition metal (at least one of the rare earth element and the intermetallic compound in the fine mixed phase contains the additive element), (3) a mixed structure comprising a phase of intermetallic compound of rare earth element—transition metal and a phase of intermetallic compound of rare earth element—additive element, (4) a mixed structure comprising any one of the mixed structures of (1),.(2) and (3) and a phase of rare earth element alone, and (5) a mixed structure of any one of the mixed structures comprising a phase of intermetallic compound of rare earth element—additive element—transition metal and a phase of rare earth element alone.

Among the structures, the fine mixed phase comprises the rare earth element and the intermetallic compound of the rare earth element and the transition metal, which is formed by reaction such as eutectic, peritectic or peritectoeutectic reaction, etc., when molten material is cooled to a normal temperature. In addition, this may be a crystalline structure formed by heating an amorphous structure caused by rapid quenching. In the structure of the present invention, the additive element may be contained in the intermetallic compound phase with the additive element being not substantially contained in the fine mixed phase, or the additive element may not be substantially contained in the intermetallic compound phase with the additive element being contained in the fine mixed phase. Furthermore, in the structure of the alloy target of the present invention the additive element is present in any one of the rare earth element and the intermetallic compound of the rare earth element and the transition metal. Thus, the additive element is incorporated to either one of the phases. Localization of the additive element in the structure enables (1) forming a binding phase for the brittle intermetallic compound phase, (2) making the film composition uniform and (3) reducing the difference in the composition between the target and the film. It is preferred that the fine mixed phase in the structure of the alloy target has a size not greater than 500 μm and contained at least 3% by volume in order to provide the foregoing effects effectively. The shape may be granular, angular, or columnar with no particular restrictions. It is essential that the phase consisting of transition metal alone is not substantially present, since it will cause undesired effect on the efficiency of utilizing the target and on the change of the film composition with lapse of sputtering time. The phase of the intermetallic compound present may be single or in plurality and there is no particular restriction for the shape and the size thereof. For the phase of the rare earth element alone, there is no particular difference regarding the function between the case where it is present as another phase or where it is not present.

Then, the alloy target according to the present invention is manufactured as a sintered product by mixing powder containing at least one additive element as described above and powder not substantially containing such additive element, and then by means of powder metallurgy.

Then, it is necessary that either one of the power containing the additive element or the powder not substantially containing additive element is an alloy powder prepared by a melting process, that is, alloy powder having such a hysteresis as being once melted, or powder formed a liquid phase upon sintering by powder metallurgy applied after mixing the starting powders. As the alloy powder; there may be mentioned those (1) prepared by pulverizing a cast alloy obtained by melting, (2) prepared by a plasma REP process (Rotation Electrode Process) using an alloy as an electrode, (3) prepared by pulverizing a flake obtained by rapidly quenching to solidify a molten alloy by a cooling device such as a roll at an ambient temperature etc.

As an example of the other powder, there can be mentioned those prepared by a reduction—diffusion process of mixing a powder of rare earth oxide, transition metal powder and additive element powder, as well as a reducing agent such as metal calcium and heating them to cause reduction of the rare earth oxide and diffusion into the transition metal powder or transition metal and additive element etc. Further, use of the single or alloy powder transition metal element requires a care in that a phase of the transition metal alone is not present in the structure of the alloy target and it is preferred to use fine particles as much as possible if used.

The thus obtained alloy powder is then used for powder metallurgy to produce an alloy target as a sintered product. That is, it is sintered, for example, by an ambient pressure sintering process of simply compressing the mixed powder at a normal temperature under the pressure of 0.5–5 $t/cm^2$ or molding it by a hydrostatic press under the pressure of 0.5–2 $t/cm^2$ and then sintering in a vacuum or an Ar atmosphere at a temperature of 700°–1300° C. for 0.5 to 5 hours, a hot pressing method of sintering in a vacuum under the pressure of 0.1–0.5 $t/cm^2$ at a temperature of from 600° to 1200° C. for 1 to 5 hours and, further, a hot hydrostatic pressing process of sealing in an elastic body and then sintering at a temperature of 600°–1200° C. under the pressure of 0.1–2 $t/cm^2$ for 0.5 to 5 hours.

The alloy target manufactured by the method as described above exhibits the structure according to the present invention. It is assumed that the fine mixed phase in the structure was present in the alloy powder prepared by the melting process or is newly present due to the formation of the liquid phase upon sintering by the powder metallurgy described above.

The alloy target according to the present invention has specific components, composition and structure and, since the phase of transition metal alone is not substantially present in the structure and a specific additive element is localized in the structure, there can be recognized remarkable effects capable of providing an alloy target having excellent characteristics such as uniform composition, having high strength with no cracking or chipping, causing less difference in the composition between the target and the film, less change in the composition of film with lapse of time, and showing high efficiency of utilizing the target.

EXAMPLES

The present invention is to be explained more specifically referring to examples.

Example 1

(1) Manufacture of Alloy Target

With an aim of manufacturing an alloy target comprising a composition: $Tb_{25}Fe_{60}Co_{10}Cr_5$, a powder comprising a composition : $Tb_{13.2}Fe_{68}Co_{12.5}Cr_{6\ 3}$ prepared by the reduction —diffusion process (average grain size : 50 μm) and an alloy powder comprising a composition: $Tb_{72}Fe_{28}$ prepared by the plasma REP process (average grain size: 100 μm) (all of the powder having purity of 99.9% by weight or high, in the blending raw material also in the examples hereinafter) were mixed in an argon gas atmosphere in a ball mill for one hour.

The mixed powder is charged in a molding device made of graphite of 152 mm inner diameter and an alloy target was manufactured by a hot-pressing under the conditions of setting the vacuum degree to $1\times10^{-4}$ Torr, applying a pressure of 100 kg/cm$^2$ for pressing the powder till a temperature was elevated to 860° C., and after the temperature elevation, increasing the pressure to 250 kg/cm$^2$ and keeping the temperature of 860° C. for 30 min and then cooling to the room temperature.

(2) Inspection for the Alloy Target

The alloy target as the sintering product was taken out from the molding device and, when inspected for the cracking, chipping, by visual inspection and transmission X-ray irradiation, they were not found at all in any of the cases.

Further, the composition and the result of the microscopic inspection for the structure of the sintering product are shown in Table 1. Among them, the size and the % by volume of the phase in the result of the microscopic observation were determined by an intercept method. The phase of the rare earth element alone and the phase of the transition metal alone were not recognized.

(3) Preparation of Thin Film

Using the alloy target (151 mm in diameter and 3 mm in thickness) prepared as in (1) above, a thin film of 3000 Å thickness was prepared by using a sputtering process (Ar gas pressure: $6\times10^{-5}$ Torr, sputtering power: 4 W/cm$^2$, substrate: soda glass). In preparation of the thin film the sputtering process was fully stable in any tests. After preparation of the thin film, when inspected for cracking and chipping by visual inspection as above mentioned, they were not found at all.

(4) Test for Thin film (1) Scattering in the film composition:

The amount of the rare earth element and the amount of the additive element are quantitatively analyzed by EPMA at six points each with 30 mm radial interval situated from the position on the substrate just above the center of the target as an original point, to determine the scattering (range).

(2) Difference in the composition between target and film :

The amount of the rare earth element and that of the additive element in the target and the film are quantitatively determined by EPMA, to determine the difference in the composition.

(3) Efficiency of utilizing target :

Reduction in the amount of the target is measured after long time use when the thickness of the target is reduced to 0.5 mm at the thinnest portion.

(4) Change of film composition with lapse of time :

Scattering (range)of the amount of the rare earth element in the thin film was determined at a time point of sputtering of 1, 5, 10 and 30 hours respectively.

Results obtained by the above-mentioned test are shown in Table 2.

Example 2

With an aim of manufacturing an alloy target comprising a composition: $Tb_{12.5}Gd_{12.5}Fe_{70}P_5$, an alloy target was manufactured to the same manner as in Example 1-(1) except for using an alloy powder comprising a composition: $Tb_{13.9}Gd_{5.9}Fe_{74.7}P_{5.5}$ prepared by the reduction-diffusion process (average grain size: 50 μm) and an alloy powder comprising a composition: $Gd_{72}Fe_{28}$ prepared by the plasma REP process (average grain size: 100 μm).

Then, a thin film was formed in the same procedures as those in Example 1-(3) by using the resultant alloy target Various tests were conducted in the same procedures as those in Example 1-(2) and (4) for the resultant alloy target and the thin film. The results are shown; respectively, in Table 1 and Table 2.

Example 3

With an aim of manufacturing an alloy target comprising a composition: $Dy_{12}Nd_{13}Fe_{60}Co_{10}Pt5$, an alloy target was manufactured in the same manner as in Example 1-(1) except for using an alloy powder of comprising a composition: $Dy_{14.4}Nd_{5.3}Fe_{77.7}Co_{8.0}Pt_{5.6}$ (average grain size 50 μm) prepared by the reduction-diffusion process and an alloy powder of comprising a composition: $Nd_{72}Co_{28}$ (average grain size: 100 μm) prepared by the cast ingot pulverization method of mechanically pulverising a melted and cast ingot, and a thin film was formed in the same procedures as those in Example 1-(3).

Various tests were conducted in the same procedures as those in Example 1-(2) and (4) for the resultant target and the thin film. The results are shown, respectively, in Table 1 and Table 2.

Example 4

With an aim of manufacturing an alloy target comprising a composition: $Tb_{25}Fe_{60}Co_{10}Cr_5$, an alloy target was manufactured in the same manner as in Example 1-(1) except for using an alloy powder comprising a composition: $Tb_{12.5}Fe_{75}Co_{12.5}$ (average grain size: 50 μm) prepared by the reduction-diffusion process and an alloy powder comprising a composition: $Tb_{75}Cr_{25}$ (average grain size: 80 μm) prepared by the cast ingot pulverization method and a thin film was formed in the same procedures as those in Example 1-(3).

Various tests were conducted in the same procedures as those in Example 1-(2) and (4) for the resultant alloy target and the thin film. The results are shown, respectively, in Table 3 and Table 4.

Example 5

With an aim of manufacturing an alloy target comprising a composition: $Tb_{12.5}Gd_{12.5}Fe_{70}P_5$, an alloy target was manufactured in the same manner as in Example 1-(1) except for using an alloy powder comprising a composition: $Tb_{8.3}Gd_{13.9}Fe_{77.8}$ (average grain size: 50 μm) prepared by the reduction-diffusion process and an alloy powder comprising a composition: $Tb_{50}P_{50}$ (average grain size: 80 μm) prepared by the cast ingot pulverization method and a thin film was formed in the same procedures as those in Example 1-(3).

Various tests were conducted in the same procedures as those in Example 1-(2) and (4) for the resultant alloy target and the thin film. The results are shown, respectively, in Table 3 and Table 4.

Example 6

With an aim of manufacturing an alloy target comprising a composition: $Dy_{12}Nd_{13}Fe_{60}Co_{10}Pt_5$, an alloy target was manufactured in the same manner as in Example 1-(1) except for using an alloy powder comprising a composition: $Dy_{13.3}Nd_{8.9}Fe_{66.7}Co_{11.1}$ (average grain size: 50 μm) prepared by the reduction-diffusion process and an alloy powder comprising a composition: $Nd_{50}Pt_{50}$(average grain size: 80 μm) prepared by the cast ingot pulverization method and a thin film was formed in the same procedures as those in Example 1-(3).

Various tests were conducted in the same procedures as those in Example 1-(2) and (4) for the resultant alloy target and the thin film. The results are shown, respectively, in Table 3 and Table 4.

In Examples 2–6, when cracking and chipping were observed and inspected before and after the formation of the thin film for the alloy targets, abnormality was recognized in none of them. Comparative Example 1

With an aim of manufacturing an alloy target comprising a composition comprising $Tb_{25}Fe_{60}Co_{10}Cr_5$, an alloy target was manufactured in the same manner as in Example 1-(1) except for using an alloy powder comprising a composition $Tb_{25}Fe_{60}Co_{10}Cr_5$ (average grain size: 50 μm) prepared by the reduction-diffusion process and a thin film was formed in the same procedures as those in Example 1-(3).

Various tests were conducted in the same procedures as those in Example 1-(2) and (4) for the resultant alloy target and the thin film. The results are shown, respectively, in Table 1 and Table 2.

Comparative Example 2

With an aim of manufacturing an alloy target comprising a composition: $Tb_{12.5}Gd_{12.5}Fe_{70}P_5$, an alloy target was manufactured in the same manner as in Example 1-(1) except for using an alloy powder comprising a composition: $Tb_{13.9}Gd_{6.1}Fe_{77.8}P_{2.2}$ (average grain size: 50 μm) prepared by reduction-diffusion process and an alloy powder comprising a composition: $Gd_{70}P_{30}$ (average grain size: 100 μm) prepared by the cast ingot pulverization method and a thin film was formed in the same procedures as those in Example 1-(3).

Various tests were conducted in the same procedures as those in Example 1-(2) and (4) for the resultant alloy target and the thin film. The results are shown, respectively, in Table 1 and Table 2.

Comparative Example 3

With an aim of manufacturing an alloy target comprising a composition: $Dy_{12}Nd_{13}Fe_{60}Co_{10}Pt_5$, an alloy target was manufactured in the same manner as in Example 1-(1) except for using an alloy powder comprising a composition: $Dy_{16.3}Nd_{15}Fe_{50}Co_{12.5}Pt_{6.3}$ (average grain size: 50 μm) prepared by the reduction-diffusion process and a metal powder comprising Fe (average grain size: 50 μm) prepared by the electrolytic process and a thin film was formed in the same procedures as those in Example 1-(3).

Various tests were conducted in the same procedures as those in Example 1-(2) and (4) for the resultant alloy target and the thin film. The results are shown, respectively, in Table 1 and Table 2.

Comparative Example 4

With an aim of manufacturing an alloy target comprising a composition: $Tb_{12.5}Gd_{12.5}Fe_{70}P_5$, an alloy target was manufactured in the same manner as in Example 1-(1) except for using an alloy powder comprising a composition: $Tb_5Gd_{13.9}Fe_{77.8}P_{3.3}$ (average grain size: 50 μm) prepared by the reduction-diffusion process and an alloy powder comprising a composition: $Tb_{80}P_{20}$ (average grain size: 80 μm) prepared by the cast ingot pulverization process and a thin film was formed in the same procedures as those in Example 1-(3).

Various tests were conducted in the same procedures as those in Example I-(2) and (4) for the resultant alloy targer and the thin film. The results are shown, respectively, in Table 3 and Table 4.

Comparative Example 5

With an aim of manufacturing an alloy target comprising a composition: $Dy_{12}Nd_{13}Fe_{60}Co_{10}Pt_5$, an alloy target was manufactured in the same manner as in Example 1-(1) except for using an alloy powder comprising a composition: $Dy_{14.4}Nd_{13.3}Fe_{61.2}Co_{11.1}$ (average grain size: 50 μm) prepared by the reduction-diffusion process and an alloy powder comprising a composition: $Fe_{50}Pt_{50}$ (average grain size: 80 μm) prepared by the cast ingot pulverization process and a thin film was formed in the same procedures as those in Example 1-(3).

Various tests were conducted in the same procedures as those in Example 1-(2) and (4) for the resultant alloy target and the thin film. The results are shown, respectively, in Table 3 and Table 4.

In Comparative Examples 1–5, when cracking and chipping were observed and inspected for the alloy targets before and after the formation of the thin films, neither cracking nor chipping was recognized.

TABLE 1

| | Starting powder used | | |
|---|---|---|---|
| | Production method: Component and composition Average grain size (μm) | Production method: Composition Average grain size (μm) | Composition of Sintering product |
| Example 1 | Reduction-diffusion process $Tb_{13.2}Fe_{68}Co_{12.5}Cr_{6.3}$ 50 μm | Plasma ERP process $Tb_{72}Fe_{28}$ 100 μm | $Tb_{25}Fe_{60}Co_{10}Cr_5$ |
| Example 2 | Reduction-diffusion process $Tb_{13.9}Gd_{5.9}Fe_{74.7}P_{5.5}$ 50 μm | Plasma REP process $Gd_{72}Fe_{28}$ 100 μm | $Tb_{12.5}Gd_{12.5}Fe_{70}P_5$ |
| Example 3 | Reduction-diffusion | Cast ingot | $Dy_{12}Nd_{13}Fe_{60}Co_{10}Pt_5$ |

TABLE 1-continued

| | | | |
|---|---|---|---|
| | process $Dy_{14.4}Nd_{5.3}Fe_{77.7}Co_{8.0}Pt_{5.6}$ 50 μm | pulverization $Nd_{72}Co_{28}$ 100 μm | |
| Comparative Example 1 | Reduction-diffusion process $Tb_{25}Fe_{60}Co_{10}Cr_{5}$ 50 μm | — — — | $Tb_{25}Fe_{60}Co_{10}Cr_{5}$ |
| Comparative Example 2 | Reduction-diffusion process $Tb_{13.9}Gd_{6.1}Fe_{77.8}P_{2.2}$ 50 μm | Cast ingot pulverization $Gd_{70}P_{30}$ 100 μm | $Tb_{12.5}Gd_{12.5}Fe_{70}P_{5}$ |
| Comparative Example 3 | Reduction-diffusion process $Dy_{16.3}Nd_{15}Fe_{50}Co_{12.5}Pt_{6.3}$ 50 μm | Electrolytic process Fe 50 μm | $Dy_{12}Nd_{13}Fe_{60}Co_{10}Pt_{5}$ |

| | Result of microscopic inspection | | | | | | |
|---|---|---|---|---|---|---|---|
| | Intermetallic compound phase | Fine mixed phase | | | Phase of transition metal alone | | |
| | | element | size (μm) | vol % | element | size (μm) | vol % |
| Example 1 | Tb—Fe—Co—Cr | Tb—Fe | 40–80 | 18 | — | — | — |
| Example 2 | Tb—Gd—Fe—P | Gd Fe | 30–70 | 9 | — | — | — |
| Example 3 | Dy—Nd—Fe—Co—Pt | Nd Co | 40–100 | 9 | — | — | — |
| Comparative Example 1 | Tb—Fe—Co—Cr | — | — | — | — | — | — |
| Comparative Example 2 | Tb—Gd—Fe—P Gd—P | — | — | — | — | — | — |
| Comparative Example 3 | Dy—Nd—Fe—Co—Pt | — | — | — | Fe | 30–60 | 15 |

TABLE 2

| | | Example 1 | Example 2 | Example 3 | Comparative Example 1 | Comparative Example 2 | Comparative Example 3 |
|---|---|---|---|---|---|---|---|
| Scattering in the film composition (atom %) | rare earth element | 0.3 | 0.2 | 0.3 | 3.5 | 0.5 | 0.5 |
| | additive element | 0.1 | 0.1 | 0.1 | 2.0 | 1.0 | 0.5 |
| Difference in the composition: Target-film (atom %) | rare earth element | 0.5 | 0.6 | 0.5 | 7.0 | 1.4 | 1.2 |
| | additive element | 0.1 | 0.2 | 0.1 | 2.0 | 1.0 | 1.1 |
| Target utilizing efficiency (Relative weight value based on the value of Comparative Example 3 assumed as 1) | | 1.3 | 1.3 | 1.3 | 1.4 | 1.3 | 1.0 |
| Change of film composition with lapse of sputtering time (atom %) | | 0.3 | 0.3 | 0.3 | 0.2 | 0.3 | 2.5 |

TABLE 3

| | Starting powder used | | |
|---|---|---|---|
| | Component and composition Production method: Reduction-diffusion process Average: 50 μm grain size | Component and composition Production method: Cast ingot pulverization process Average: 80 μm grain size | Composition of Sintering product |
| Example 4 | $Tb_{12.5}Fe_{75}Co_{12.5}$ | $Tb_{75}Cr_{25}$ | $Tb_{25}Fe_{60}Co_{10}Cr_{5}$ |
| Example 5 | $Tb_{8.3}Gd_{13.9}Fe_{77.8}$ | $Tb_{50}P_{50}$ | $Tb_{12.5}Gd_{12.5}Fe_{70}P_{5}$ |
| Example 6 | $Dy_{13.2}Nd_{8.9}Fe_{66.7}Co_{11.1}$ | $Nd_{50}Pt_{50}$ | $Dy_{12}Nd_{13}Fe_{60}Co_{10}Pt_{5}$ |
| Comparative Example 4 | $Tb_{5}Gd_{13.9}Fe_{77.8}P_{3.3}$ | $Tb_{80}P_{20}$ | $Tb_{12.5}Gd_{12.5}Fe_{70}P_{5}$ |
| Comparative Example 5 | $Dy_{14.4}Nd_{13.3}Fe_{61.2}Co_{11.1}$ | $Fe_{50}Pt_{50}$ | $Dy_{12}Nd_{13}Fe_{60}Co_{10}Pt_{5}$ |

| Result of microscopic inspection | | | | | | | | | |
|---|---|---|---|---|---|---|---|---|---|
| Intermetallic compound phase I | Intermetallic compound phase II | | | Phase of rare earth element alone | | | Phase of transition metal alone | | |
| | element | size (μm) | vol % | element | size (μm) | vol % | element | size (μm) | vol % |

TABLE 3-continued

| | | | | | | | | | | |
|---|---|---|---|---|---|---|---|---|---|---|
| Example 4 | Tb—Fe—Co | Tb—Cr | 30–70 | 18 | — | — | — | — | — | — |
| Example 5 | Tb—Gd—Fe | Tb—P | 40–90 | 9 | — | — | — | — | — | — |
| Example 6 | Dy—Nd—Fe—Co | Nd—Pt | 40–90 | 9 | — | — | — | — | — | — |
| Comparative Example 4 | Tb—Gd—Fe—P | Tb—P | 30–60 | 7 | Tb | 10 | 2 | — | — | — |
| Comparative Example 5 | Dy—Nd—Fe—Co | — | — | — | — | — | — | Fe—Pt | 30–90 | 15 |

TABLE 4

| | | Example 4 | Example 5 | Example 6 | Comparative Example 4 | Comparative Example 5 |
|---|---|---|---|---|---|---|
| Scattering in the film composition (atom %) | rare earth element | 0.3 | 0.2 | 0.3 | 0.5 | 0.5 |
| | additive element | 0.1 | 0.1 | 0.1 | 1.0 | 0.5 |
| Difference in the composition: Target-film (atom %) | rare earth element | 0.5 | 0.6 | 0.5 | 1.4 | 1.2 |
| | additive element | 0.1 | 0.2 | 0.1 | 1.0 | 1.1 |
| Target utilizing efficiency (Relative weight value based on the value of Comparative Example 5 assumed as 1) | | 1.3 | 1.3 | 1.3 | 1.3 | 1.0 |
| Change of film composition with lapse of sputtering time (atom %) | | 0.3 | 0.3 | 0.3 | 0.3 | 2.5 |

From the results, it is apparently recognized that those not having a structure in which the additive element is not localized (Comparative Examples 2, 4) and in which a phase of transition metal alone is present (Comparative Examples 3, 5) show poor results of tests as compared with Examples 1-6.

What is claimed is:

1. An alloy target for use in manufacturing a magneto-optical recording medium, wherein the component and composition comprises from 10-50 atom % of at least one rare earth element selected from the group consisting of Nd, Sm, Gd, Tb, Dy, Ho, Er and Tm, from 0.1 to 10 atom % of at least one additive element selected from the group consisting of B, AL, Si, P. Ti, V, Cr, Mn, Zr, Nb, Mo, Hf, Ta, W, Pt, Pb and Bi, and the balance substantially composed of at least one transition metal selected from the group consisting of Co, Fe and Ni; and a structure comprises any one of mixed structure from the group consisting of (1) a mixed structure comprising a phase of intermetallic compound of rare earth element—additive element—transition metal, and a fine mixed phase of rare earth element and intermetallic compound of rare earth element—transition metal, (2) a mixed structure comprising a phase of intermetallic compound of rare earth element—transition metal and a fine mixed phase of rare earth element and intermetallic compound of rare earth element—transition metal, at least one of the rare earth element and the intermetallic compound in the fine mixed phase containing the additive element; (3) a mixed phase comprising a phase of intermetallic compound of rare earth element—transition metal and a phase of intermetallic compound of rare earth element—additive element; (4) a mixed structure comprising any one of said mixed structures (1), (2), and (3) above and a phase of rare earth element along, and (5) a mixed structure of any one of the mixed structures comprising a phase of intermetallic compound of rare earth element—additive element—transition metal, and a phase of the rare earth element along; in which a phase of transition metal alone is not substantially present.

2. An alloy target used for manufacturing a magneto-optical recording medium as defined in claim 1, wherein the mixed structure comprises a phase of the intermetallic compound of rare earth element—additive element—transition metal, and a fine mixed phase of rare earth element and intermetallic compound of rare earth element—transition metal.

3. An alloy target used for manufacturing a magneto-optical recording medium as defined in claim 1, wherein the mixed structure comprises a phase of intermetallic compound of rare earth element—additive element—transition metal, and a fine mixed phase of the rare earth element and the intermetallic compound of rare earth element—transition metal, and a phase of the rare earth element alone.

4. An alloy target used for manufacturing a magneto-optical recording medium as defined in claim 1, wherein the mixed structure comprises a phase of the intermetallic compound of rare earth element—transition metal and a fine mixed phase of the rare earth element and the intermetallic compound of rare earth element—transition metal, at least one of the rare earth element and the intermetallic compound in the fine mixed phase containing additive element.

5. An alloy target used for manufacturing a magneto-optical recording medium as defined in claim 1, wherein the mixed structure comprises, a phase of the intermetallic compound of rare earth element—transition metal and a fine mixed phase of rare earth element and the intermetallic compound of the rare earth element—transition metal, at least one of the rare earth elements and the intermetallic compound in the fine mixed phase contains additive element, and a phase of the rare earth element alone.

6. An alloy target used for manufacturing a magneto-optical recording medium as defined in claim 1, wherein the mixed structure comprises a phase of intermetallic compound of rare earth element—transition metal, and a phase of intermetallic compound of rare earth element—additive element.

7. An alloy target used for manufacturing a magneto-optical recording medium as defined in claim 1, wherein the mixed structure comprises a phase of intermetallic compound of rare earth element—transition metal, a phase of intermetallic compound of rare earth element—additive element, and a phase of the rare earth element alone.

8. An alloy target used for manufacturing a magneto-optical recording medium as defined in claim 1, wherein the mixed structure comprises a phase of intermetallic compound of rare earth element—additive element—transition metal, and a phase of the rare earth element alone.

* * * * *